(12) United States Patent
Allen et al.

(10) Patent No.: US 9,788,533 B2
(45) Date of Patent: Oct. 17, 2017

(54) AQUARIUM FILTER

(71) Applicant: Elive LLC, New Berlin, WI (US)

(72) Inventors: Matthew Allen, Waterford, WI (US); Thomas Lutz, Cedar Rapids, IA (US)

(73) Assignee: ELIVE LLC, New Berlin, WI (US)

( * ) Notice: Subject to any disclaimer, the term of this patent is extended or adjusted under 35 U.S.C. 154(b) by 19 days.

(21) Appl. No.: 14/047,558

(22) Filed: Oct. 7, 2013

(65) Prior Publication Data

US 2014/0096718 A1   Apr. 10, 2014

Related U.S. Application Data

(60) Provisional application No. 61/711,571, filed on Oct. 9, 2012.

(51) Int. Cl.
*A01K 63/04* (2006.01)

(52) U.S. Cl.
CPC .......... *A01K 63/045* (2013.01); *A01K 63/047* (2013.01)

(58) Field of Classification Search
CPC ...... A01K 63/00; A01K 63/04; A01K 63/045; A01K 63/003; A01K 63/006
USPC ....... 119/259, 245, 247, 248, 257, 269, 251, 119/260, 261
See application file for complete search history.

(56) References Cited

U.S. PATENT DOCUMENTS

| | | | |
|---|---|---|---|
| 3,288,110 A | * | 11/1966 | Goldman et al. ............. 119/248 |
| 3,485,373 A | * | 12/1969 | Powers ................... 210/167.27 |
| 3,511,376 A | * | 5/1970 | Sesholtz .............. A01K 63/045 |
| | | | 210/167.25 |
| 3,513,978 A | * | 5/1970 | Newsteder ............... 210/167.25 |
| 3,651,785 A | * | 3/1972 | Quinn .......................... 119/248 |
| 3,983,843 A | | 10/1976 | Johnson |
| 4,036,756 A | | 7/1977 | Dockery |
| 4,039,453 A | | 8/1977 | Horvath |
| 4,093,547 A | | 6/1978 | Sherman et al. |
| 4,154,681 A | | 5/1979 | Shields et al. |
| 4,163,035 A | | 7/1979 | Gorsky |
| 4,206,719 A | | 6/1980 | Faris |

(Continued)

OTHER PUBLICATIONS

"EcoQube—Desktop Ecosystem That Grows Flowers and Herbs", by Aqua Design Innovations, https://www.kickstarter.com/projects/kevinzl/ecoqube-desktop-ecosystem-that-grow-flowers-and-he, Dec. 30, 2013 (25 pages).

*Primary Examiner* — Peter M Poon
*Assistant Examiner* — Magdalena Topolski
(74) *Attorney, Agent, or Firm* — Michael Best & Friedrich LLP

(57) ABSTRACT

An aquarium includes a first chamber arranged to contain a first volume of liquid, a dry chamber that is adjacent the first chamber and defines a second volume, and a removable element at least partially disposed within the dry chamber. The removable element is selectively removable from the dry chamber. The aquarium also includes a filter at least partially disposed within the removable element, and a pump including an intake and an outlet. The intake is arranged to draw a flow of liquid from the first volume of liquid during pump operation. The aquarium also includes a tube having a first end connected to the outlet and a second end movable between a first position in which the flow of liquid passes through the filter and is then discharged into the first volume and a second position in which the flow of liquid flows directly into the first volume.

16 Claims, 10 Drawing Sheets

(56) References Cited

U.S. PATENT DOCUMENTS

| | | | |
|---|---|---|---|
| 4,220,530 A * | 9/1980 | Gabriele | 210/86 |
| 4,282,095 A | 8/1981 | Tsuhako | |
| 4,285,813 A | 8/1981 | Stewart et al. | |
| 4,490,250 A | 12/1984 | Dockery | |
| 4,512,885 A | 4/1985 | Willinger | |
| 4,601,821 A | 7/1986 | Sherman et al. | |
| 4,620,924 A | 11/1986 | Goldman et al. | |
| 4,684,462 A * | 8/1987 | Augustyniak | A01K 63/045 |
| | | | 119/260 |
| 4,761,227 A | 8/1988 | Willinger et al. | |
| 4,802,980 A | 2/1989 | Gilkey et al. | |
| 4,807,565 A | 2/1989 | Hawthorne | |
| 4,820,410 A | 4/1989 | Calvacante | |
| 4,842,727 A | 6/1989 | Willinger et al. | |
| 4,895,646 A | 1/1990 | Willinger | |
| 4,936,981 A | 6/1990 | Baisley et al. | |
| 4,957,623 A | 9/1990 | Henzlik | |
| 4,978,444 A | 12/1990 | Rommel | |
| 4,997,559 A | 3/1991 | Ellis et al. | |
| 5,002,660 A | 3/1991 | Sherman et al. | |
| 5,096,576 A | 3/1992 | Szabo | |
| 5,098,585 A | 3/1992 | Woltman et al. | |
| 5,108,594 A | 4/1992 | Giovanetti et al. | |
| 5,139,656 A | 8/1992 | Gonnello | |
| 5,160,607 A | 11/1992 | Thiemer et al. | |
| 5,171,438 A | 12/1992 | Korcz | |
| 5,172,650 A * | 12/1992 | Hsu et al. | 119/259 |
| 5,228,986 A | 7/1993 | Ellis et al. | |
| 5,242,582 A | 9/1993 | Marioni | |
| 5,245,945 A * | 9/1993 | Liao | 119/248 |
| 5,290,436 A | 3/1994 | Danner | |
| 5,306,421 A | 4/1994 | Weinstein | |
| 5,397,463 A | 3/1995 | Woltmann | |
| 5,401,401 A | 3/1995 | Hickok et al. | |
| 5,409,603 A | 4/1995 | Tsung | |
| 5,419,831 A | 5/1995 | Fuerst et al. | |
| 5,423,978 A | 6/1995 | Snyder et al. | |
| 5,453,182 A | 9/1995 | Kikuta | |
| 5,474,673 A | 12/1995 | Ludlow | |
| 5,501,790 A | 3/1996 | Wiedemann | |
| 5,514,280 A | 5/1996 | Logan | |
| 5,518,611 A | 5/1996 | Bresolin | |
| 5,585,010 A | 12/1996 | Dockery et al. | |
| 5,603,831 A | 2/1997 | Hickok | |
| 5,618,428 A | 4/1997 | Oslund | |
| 5,628,281 A | 5/1997 | Kelley | |
| 5,628,905 A | 5/1997 | Montalbano | |
| 5,632,887 A * | 5/1997 | Gargas et al. | 210/151 |
| 5,679,253 A | 10/1997 | Fuerst et al. | |
| 5,728,293 A | 3/1998 | Guoli et al. | |
| 5,779,885 A | 7/1998 | Hickok et al. | |
| 5,853,591 A | 12/1998 | Snyder et al. | |
| 5,965,016 A | 10/1999 | Suchowski et al. | |
| 6,202,597 B1 | 3/2001 | Hsiung | |
| 6,202,677 B1 | 3/2001 | Chen et al. | |
| 6,523,498 B1 | 2/2003 | Shyu | |
| 6,797,163 B2 | 9/2004 | Carley et al. | |
| 6,843,909 B1 | 1/2005 | Woltmann | |
| 6,869,530 B1 | 3/2005 | Venezia | |
| 7,001,509 B1 | 2/2006 | Lin | |
| 7,022,227 B1 | 4/2006 | Liao | |
| 7,241,379 B2 | 7/2007 | Agresta | |
| 7,252,762 B2 | 8/2007 | Carley | |
| 7,273,547 B2 | 9/2007 | Ogawa | |
| 7,288,189 B2 | 10/2007 | Bonifer | |
| 7,316,775 B2 | 1/2008 | Carley et al. | |
| 7,425,274 B1 | 9/2008 | Helfet | |
| 7,429,321 B2 | 9/2008 | Willinger | |
| 7,488,417 B2 | 2/2009 | Chauquet et al. | |
| 7,569,139 B2 | 8/2009 | Mihlbauer et al. | |
| 7,594,998 B2 | 9/2009 | Mihlbauer et al. | |
| 7,601,259 B2 | 10/2009 | Mihlbauer et al. | |
| 7,618,534 B2 | 11/2009 | Mihlbauer et al. | |
| 7,628,913 B2 | 12/2009 | Willinger | |
| 7,638,044 B2 | 12/2009 | Huehn et al. | |
| 7,651,609 B2 | 1/2010 | Huehn | |
| 7,708,883 B2 | 5/2010 | Wong | |
| 7,771,592 B2 | 8/2010 | Mihlbauer et al. | |
| 7,832,358 B2 | 11/2010 | Tsai | |
| 7,927,483 B2 | 4/2011 | Huehn | |
| 8,132,534 B2 * | 3/2012 | Arita et al. | 119/259 |
| 8,453,605 B2 * | 6/2013 | Tominaga et al. | 119/259 |
| 2003/0205512 A1 * | 11/2003 | Chen | 210/169 |
| 2004/0050759 A1 * | 3/2004 | Ogawa | 210/97 |
| 2004/0222137 A1 * | 11/2004 | Hashimoto | 210/169 |
| 2006/0102537 A1 * | 5/2006 | Hochgesang et al. | 210/169 |
| 2006/0102538 A1 * | 5/2006 | Chang | 210/169 |
| 2007/0138075 A1 * | 6/2007 | Chang | 210/167.22 |
| 2007/0262012 A1 * | 11/2007 | Wong | 210/266 |
| 2009/0056638 A1 * | 3/2009 | Ting | 119/248 |
| 2009/0178623 A1 * | 7/2009 | Ford | 119/260 |
| 2009/0255480 A1 * | 10/2009 | Tsai | A01K 63/045 |
| | | | 119/259 |
| 2010/0236489 A1 * | 9/2010 | Arita et al. | 119/247 |
| 2011/0162585 A1 * | 7/2011 | Tominaga | A01K 63/045 |
| | | | 119/259 |
| 2013/0284107 A1 * | 10/2013 | Lari | 119/259 |
| 2014/0216351 A1 * | 8/2014 | Blake | 119/253 |
| 2015/0000607 A1 * | 1/2015 | Reid et al. | 119/248 |

* cited by examiner

AQUARIUM FILTER

CROSS REFERENCE TO RELATED APPLICATIONS

This application claims priority to U.S. Provisional Application No. 61/711,572, filed Oct. 9, 2012.

FIELD OF THE INVENTION

The present invention is directed to aquarium filtration and maintenance.

BACKGROUND OF THE INVENTION

Residential aquarium-keeping is an established industry in the United States and around the world. The most basic version of an aquarium consists of a transparent container for aquatic life to be viewed and housed within. These containers are typically constructed of either glass or a transparent plastic material such as acrylic or polystyrene but may be made of other transparent or semi-transparent materials. Basic aquatic environments of this nature are limited in their ability to sustain suitable conditions and water quality for all but a handful of robust and hearty fish. More appropriate for the health and well-being of the aquatic organisms is the addition of filtration, lighting, oxygenation, temperature control, and chemical and biological balance.

The need for temperature management of an aquarium varies significantly based on external environmental conditions as well as the species of aquatic animal or plant kept within the aquarium. Temperature is maintained by either adding heat to the aquarium when the water temperature is below what is desired or by chilling the water down to the "proper" or desirable temperature. In a condition in which heating is required, an external heating element is added to the tank to raise the temperature of the tank. These heating elements are fundamentally resistive heating elements contained within a waterproof plastic, glass, or metal housing. The heater is placed within the water chamber of the aquarium and contains thermal sensors/switches to raise the temperature of the water. There are a variety of control and temperature management systems, but all currently available heating elements contain an electrical wire that leads into the water column of the aquarium to connect a power supply with the heating element. These types of heating elements can be used on micro desktop aquariums of as little as 0.5 gallons up to aquariums containing hundreds of gallons of water.

Temperature management for cooling down an aquarium to a desired temperature is typically performed through external plumbing of the aquarium to a "chiller". This is often done through external plumbing and "removal" of water from the aquarium to maintain water temperature. These external cooling systems often have a heating system included as well. These systems are most typical of large aquatic environments where the total water volume of the system exceeds 30 gallons or more, and more typically 55 gallons or more.

Lighting needs of an aquarium range from decorative to functional. In the simplest version, decorative lighting is a low intensity light either in or on the aquarium that is used to provide an aesthetic appeal to the consumer. Functional needs vary greatly and are dictated by the species present. Lighting used within the aquarium industry varies from incandescent, LED, fluorescent, metal halide and even plasma lighting. The major trends are towards LED lighting. In decorative in-tank lighting, the LED light is often coupled with an air-stone or other decor to provide an aesthetic appeal to the consumer. In these systems there is often a power cord for the light (or multiple power cords for lighting) as well as an air-tube that enters into the water column. In external lighting, the power cord attaches to a light that either is integrated into the tank or sits on its surface to illuminate the aquarium.

Chemical balance for an aquarium is essential to sustain life in the aquarium. Ammonia, nitrite and nitrate are toxic elements to fish and need to be properly maintained. Depending on the species of fish in the tank, proper balance of other chemicals is also critical to aquarium health. For example elements such as strontium, calcium, magnesium, phosphorus, iodine as well as the pH of the system require proper balance. In advanced systems, water chemistry can be continuously or periodically monitored to ensure proper balance. Some systems can even continuously balance these elements. Biological balance is important as nitrosomonas and nitrobacter bacteria species complete the nitrogen cycle and naturally transform Ammonia and nitrite to nitrate (the least toxic of the three to aquatic life).

Dissolved oxygen is a fundamental requirement for aquatic life. In most aquariums, oxygenation is maintained through transient surface agitation from filtration, normal gas exchange (if the load on the aquarium to surface area of the tank is not too high), or through addition of air through the system through airstones and an air pump.

The single most critical element to successful aquarium keeping is the aquarium filter. The aquarium filter has been around for over 40 years in some form or another. Filtration systems for aquariums include air filters, power filters, external sump filters, canister filters, hang on filters, "horizontal" above aquarium filters, internal filters and other specialized filtration (including ion exchange, skimmers, etc.). With the exception of specialized filtration, all other traditional filters serve the purpose of moving water through a filtration system to remove impurities from the aquarium. Current technology focuses almost exclusively on water pump driven filtration. In a water pump driven filtration system the water is actively (and mechanically) pushed or pulled through a filtration device that contains filtration media. The filtration system most typically incorporates a variety of filtration methods including mechanical (a coarse and sometimes fine filter material), chemical filtration (most typically activated carbon to treat chemical pollutants), and biological filtration (to allow naturally occurring bacteria to thrive and treat the water). In all water filtration systems the water is pumped from the aquarium into a mechanism that includes some or all of these filtration elements and then returns the water back into the aquarium. For best results the mechanical filtration should be either cleaned or replaced 1-2 times per month, the chemical filtration should be replaced 1-2 times per month, and the biological filtration should be left untouched.

Aquarium maintenance is derived from three elements. The first (and partially unnecessary element for aquarium health) is derived from consumer desire to keep an aesthetically "clean" aquarium. This often means removal of algae and detritus from the glass and décor surfaces. This maintenance can often be more problematic to the health of the aquarium than beneficial but is considered a necessary element of aquarium maintenance. This cleaning is beneficial when the maintenance cleans detritus and debris from the gravel/substrate itself. In time, these organic materials will break down into contaminants that can be harmful to fish.

The second element is to change the water of an aquarium. This should be done on a partial basis in order to maintain beneficial bacteria that reside in the aquarium. The purpose of doing a water change is to remove naturally occurring chemicals that build up in the aquarium (most critically nitrate) because of the nature of the artificial environment. The rate of buildup is determined based on fish load, plant load, and feeding load on the aquarium. This is highly variable and as such it is recommended that 20-25% of an aquarium be changed on a monthly basis. The effective dilution effect on contaminant level buildup when changed on this schedule has shown to, as a general rule of thumb, keep contaminant levels at healthy levels for the aquarium. In more advanced systems chemical balance incorporates additional maintenance (e.g., additions/resin exchange).

The third and final aquarium maintenance required is on the filtration system itself. Mechanical filtration needs to be either cleaned or replaced on at least a monthly basis and chemical filtration should be replaced on approximately a monthly or more frequent basis. It is these combined maintenance elements that both lead to the highest level of consumer frustration, and when not conducted properly, lead to unhealthy aquariums.

A water change is currently conducted in only one fashion. Water is "drawn" out of the aquarium effectively reducing the water volume in the aquarium by 15-100% and subsequently reducing the water height in the interior chamber of the aquarium by a proportionate amount. The desirable volume should be approximately 20-25% and can extend to as high as 50%, but misinformation and misunderstanding often lead to 100% water change by new consumers to the hobby. Depending on the size of the aquarium this water change is conducted by the following:

Moving the aquarium to a sink and pouring water out to a desired level. Due to weight constraints, this is typically only done on the smallest of aquariums (1-2 gallons and smaller). In order to perform this type of water change all electrical appliances in the aquarium must be removed or unplugged and transferred with the aquarium. There is further risk of disrupting décor, plants and fish through this transfer and pour.

Removing water from the aquarium "in place". This is done by pumping, suctioning, siphoning or physically scooping water out of the tank. This method requires additional equipment not integral and is performed on most aquariums larger than 1-2 gallons. Water is then typically placed in a bucket or other transfer device to be added back to the aquarium. This method of conducting a water change requires external equipment not integral to the aquarium, often is cumbersome and timely to perform, and often times leaves a residual mess that requires further cleaning to complete the water change (for example water dripping on the floor, added buckets, tubes, pumps to clean and store). If not unplugged or performed with care, heating elements can be left exposed to the air during water changes of this nature. This can lead to failure of the heater itself which at minimum renders the heater useless and in a worst case scenario presents a major failure risk.

Filtration maintenance is often done at the same time as a water change but does not have to be. This requires removal of the filtration media (mechanical and chemical). In many current filtration systems these two elements are integrated into a single unit. In these systems the entire "cartridge" is disposed and replaced with a new cartridge. In other systems the mechanical and chemical cartridge or element are separate. In these systems the mechanical portion is either cleaned or replaced and the chemical media is replaced. In either scenario the consumer removes a wet element from the aquarium environment and needs to transport the wet, dirty, soiled cartridge to a sink for cleaning or garbage for disposal. In either case the cartridge either drips and drops contaminant onto the floor or counter top until it reaches its destination or some external device is used to prevent this from occurring (often a bucket, tub, paper towel, etc.). In all cases the consumer risks making a mess and/or having additional elements to clean upon completion of providing the maintenance to the filter.

SUMMARY

In accordance with one construction, an aquarium includes a first chamber arranged to contain a first volume of liquid, a dry chamber that is adjacent the first chamber and defines a second volume, and a removable element at least partially disposed within the dry chamber. The removable element is selectively removable from the dry chamber. The aquarium also includes a filter at least partially disposed within the removable element, and a pump including an intake and an outlet. The intake is arranged to draw a flow of liquid from the first volume of liquid during pump operation. The aquarium also includes a tube having a first end connected to the outlet and a second end movable between a first position in which the flow of liquid passes through the filter and is then discharged into the first volume and a second position in which the flow of liquid flows directly into the first volume.

In accordance with another construction, an aquarium includes a first chamber arranged to contain a first volume of liquid, a dry chamber disposed adjacent the first chamber and defining a second volume, and a removable element at least partially disposed within the dry chamber. The removable element is selectively removable from the dry chamber. The aquarium also includes a filter at least partially disposed within the removable element, and a pump including an intake and an outlet. The intake is arranged to draw a flow of liquid from the first volume of liquid during pump operation. The aquarium also includes a tube having a first end connected to the outlet and a second end movable between a first position in which the flow of liquid passes through the filter and is then discharged into the first volume and a second position in which the flow of liquid flows directly into the first volume.

In accordance with another construction, a method of operating an aquarium that contains a first volume of liquid in a first space includes operating a pump to direct a flow of liquid from the first volume to a filter via a tube in a first position. The filter is disposed within a removable element that defines a second volume. The method also includes performing one of a filter change and a water change. The filter change includes the steps of moving the tube to a second position to direct the flow of liquid directly back into the first volume, removing the removable element and the filter from the aquarium, changing at least a portion of the filter at a location remote from the aquarium, returning the removable element and the filter to the aquarium, and moving the tube to the first position to direct the flow of liquid through the filter and back into the first volume. The water change includes the steps of moving the tube to a third position to direct the flow of liquid directly into the removable element, removing the removable element and the filter from the aquarium, disposing of the liquid within the removable element at a location remote from the aquarium, adding a volume of fresh liquid to the removable element from a remote source, returning the removable element and the filter to the aquarium, adding the fresh liquid from the removable element to the first volume, and moving the tube to the first position to direct the flow of liquid through the filter and back into the first volume.

Other aspects of the invention will become apparent by consideration of the detailed description and accompanying drawings.

Figure 1:
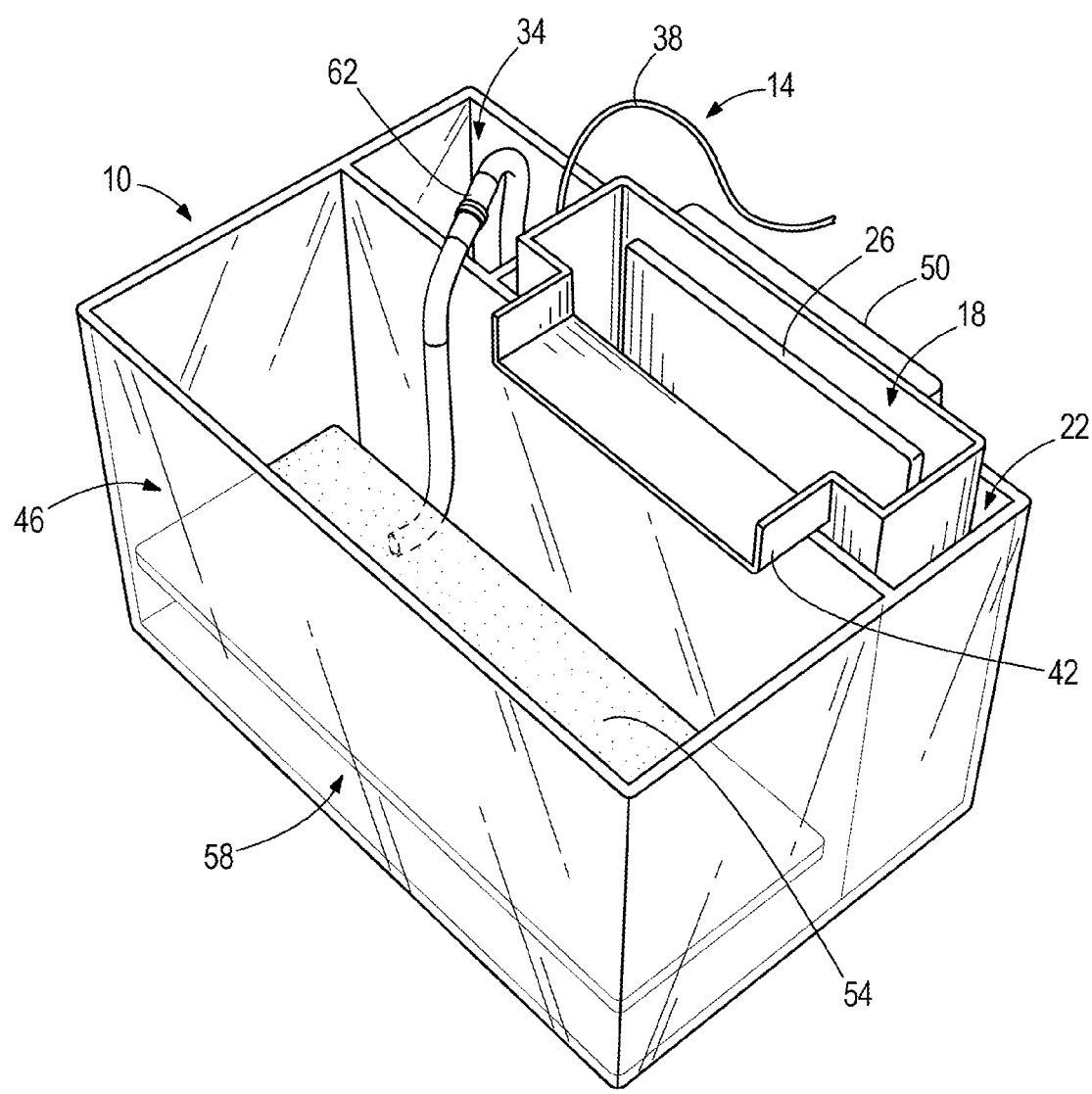
FIG. 1 is a perspective view of a fully assembled aquarium with an internal filtration system according to one construction of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limited.

DETAILED DESCRIPTION

FIGS. 1-4 illustrate an aquarium 10 with an integrated filtration system 14. The aquarium 10 is sized and configured to contain fish and other livestock. The filtration system 14 includes a removable filtration element 18 that resides within a dry, back chamber 22 of the aquarium 10. The element 18 is sized to contain and hold a removable filtration media 26 (e.g., a removable filter cartridge).

When the filtration system 14 is in an operating state, water is pumped into the element 18 with a pump 30 (illustrated in FIG. 2) disposed in a pump chamber 34. The water flows from the pump 30, through a water tube 38, and into the element 18. The water then passes through the filtration media 26 and eventually exits the element 18 through a return spout or ramp 42 that returns the water to a primary chamber 46 of the aquarium 10. The primary chamber 46 is a viewable container in which livestock and/or an aesthetically appealing portion of the aquarium 10 are situated, similar to a traditional aquarium.

The element 18 remains externally dry while in operation, while being a water-tight element to contain water internally. The chamber 22, which is configured to remain dry, provides a safety backup should any water overflow from the element 18 but fail to enter the primary chamber 46. The volume of the element 18 is small enough to only contain the filtration media 26, or as is more preferred, is sized to receive and hold up to 15-25% of a total water volume of the aquarium 10 (i.e., a water volume that resides in primary chamber 46 while the filtration system 14 is not in use). In some constructions the element 18 is sized to receive and hold between approximately 10%-25% of the total water volume. Smaller water changes, such as a 10% water change, more frequently reduces a fluctuation in water chemistry, making a more stable environment. In some constructions the element 18 is an external element that is not integrated into the aquarium 10.

Figure 2:
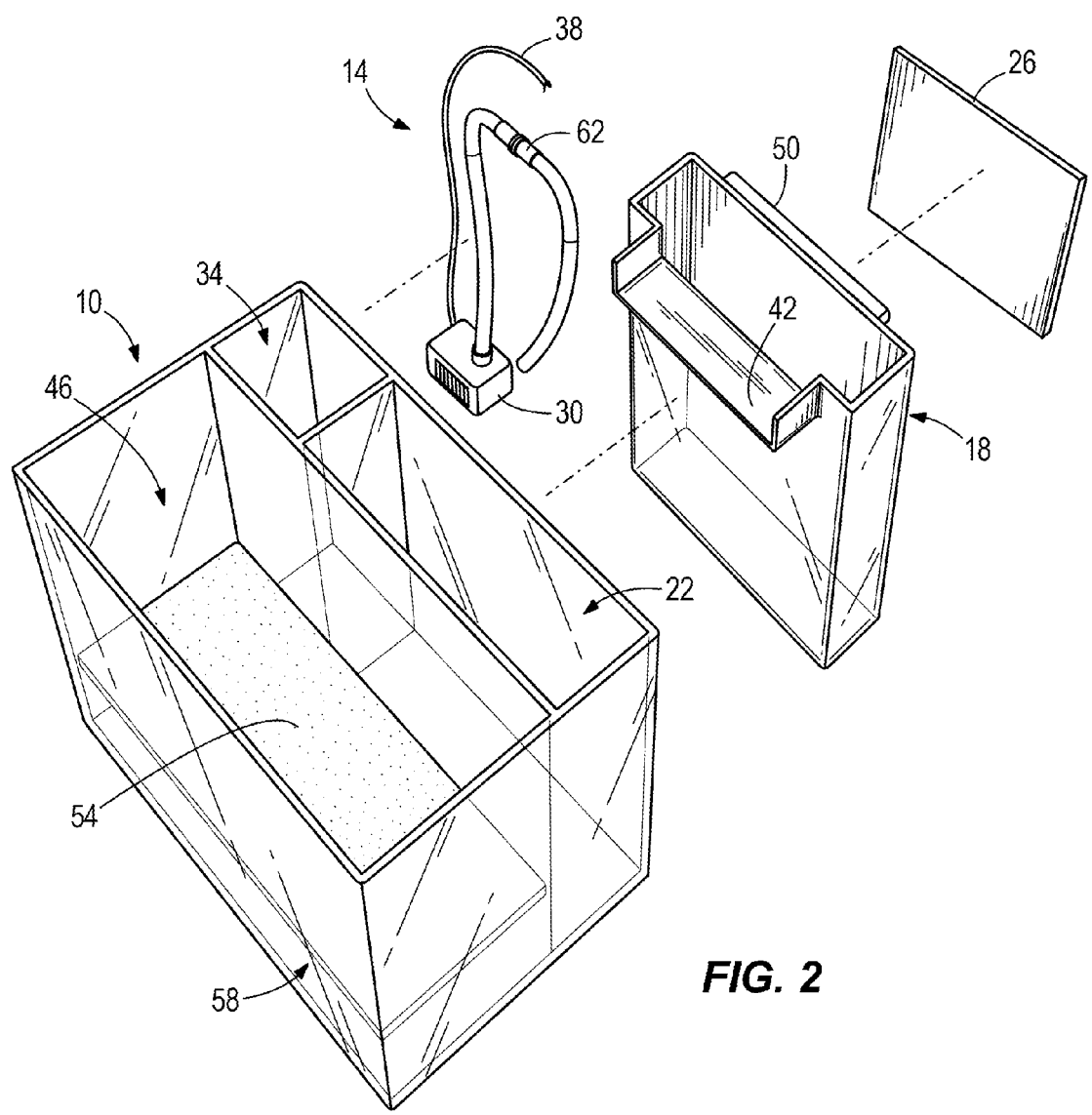
FIG. 2 is a perspective, exploded view of the components of the aquarium and internal filtration system of FIG. 1.
Figure 3:
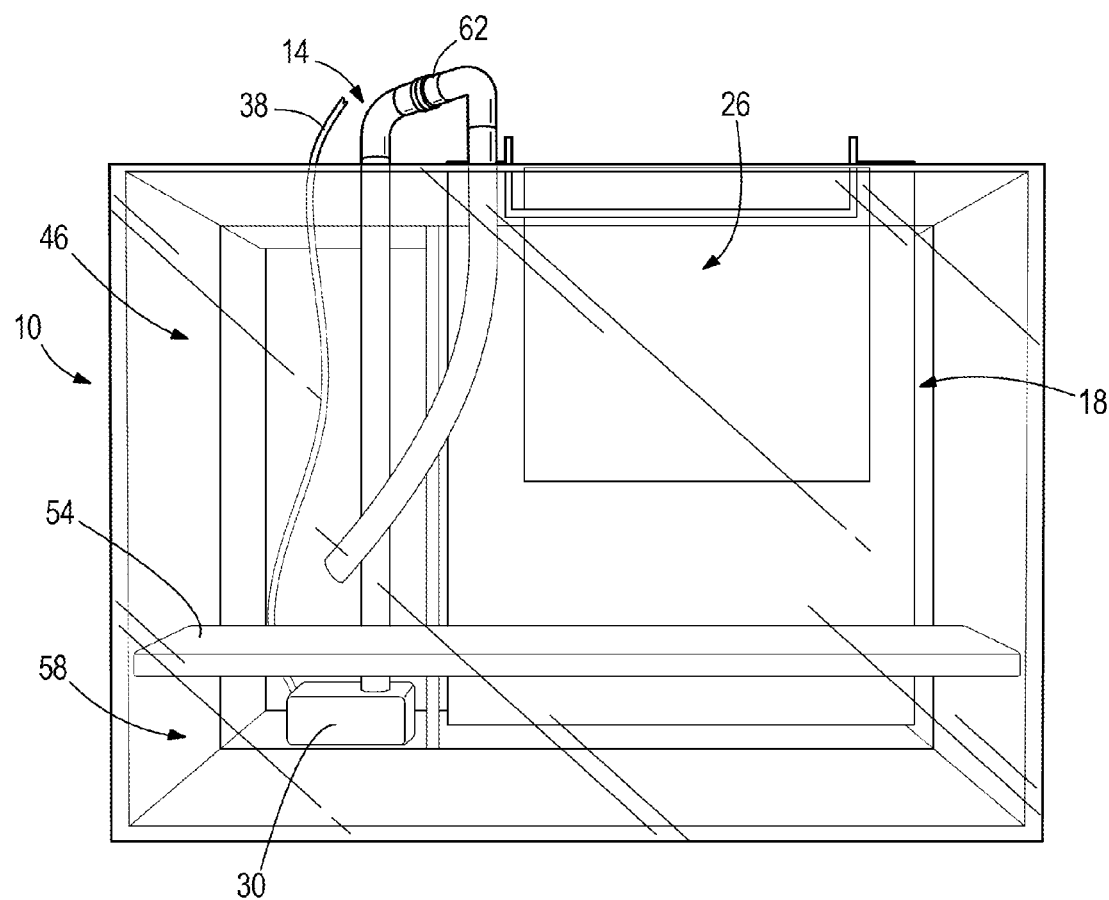
FIG. 3 is a front elevation view of the aquarium and internal filtration system of FIG. 1.
Figure 4:
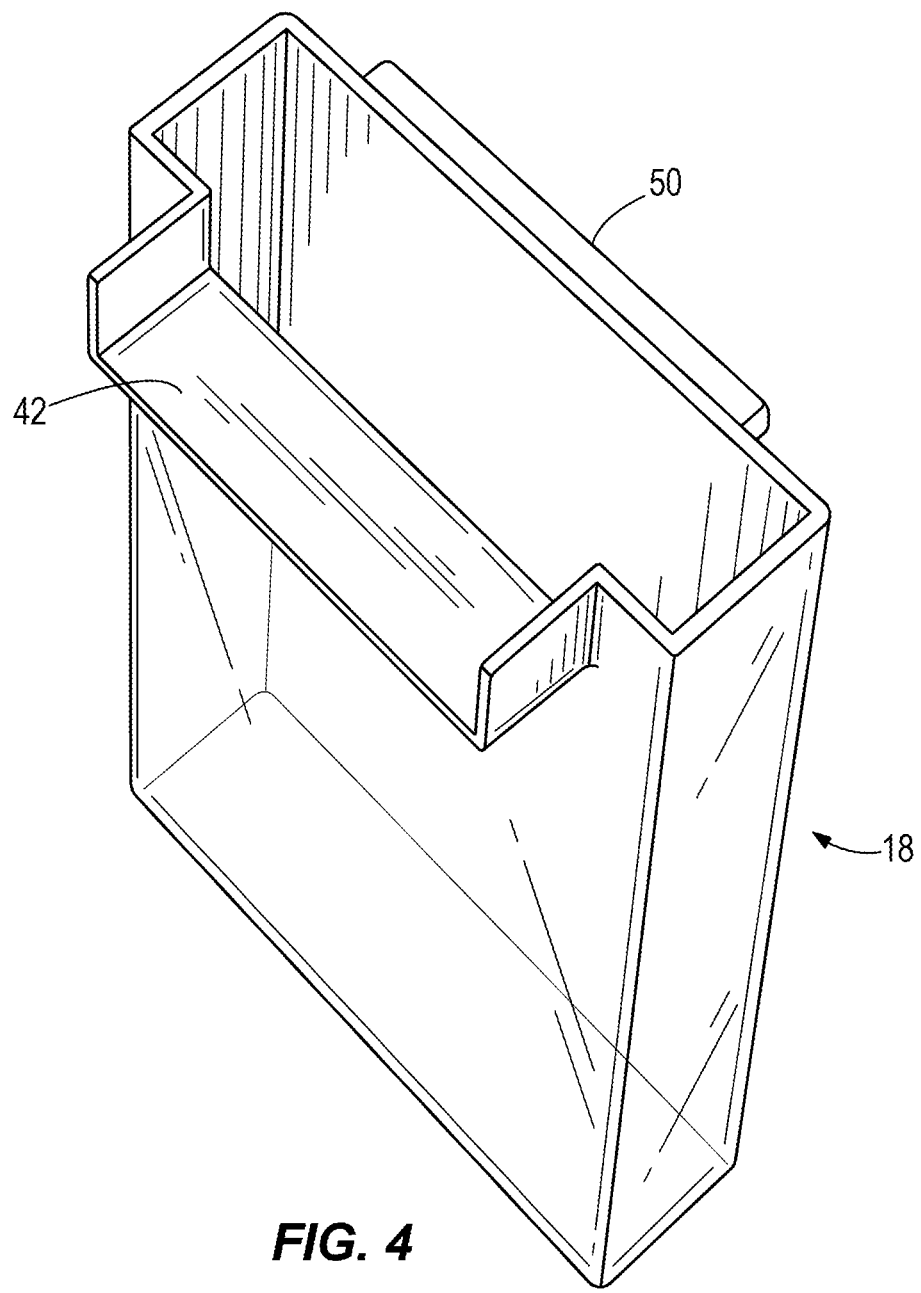
FIG. 4 is a perspective view of a removable element of the internal filtration system of FIG. 1.

With continued reference to FIGS. 1-4, the element 18 provides a way to easily service the aquarium filtration system 14. As illustrated in FIG. 4, for example, the element 18 includes a handle 50. In some constructions a strap or other element are used instead. The filtration system 14 enables a user to remove the element 18 (e.g., by grasping the handle 50), as well as the filtration media 26, from the aquarium 10 to service or transport the element 18 and the filtration media 26, without the difficulties of dripping water, re-soiling the aquarium, or other issues associated with traditional filtration media maintenance.

When the element 18 is to be serviced, the water tube 38 is easily rotated from the removable element 18 to the primary chamber 46. This enables continuous water flow during servicing. In some constructions, the pump 30 is turned off during servicing. Both options maintain water levels in the aquarium 10, thereby providing benefit to the inhabitants of the aquarium 10 and reducing the risks associated with possible electrical failure of a heater when not turned off during maintenance. However, continuous circulation provides added benefits that no current aquarium servicing systems provide. This includes continuous oxygenation, water flow, and water levels. No current water change technology accomplishes any of these three elements, let alone all three simultaneously.

With continued reference to FIGS. 1-3, the aquarium 10 also includes an under-gravel plate 54 and a plenum 58 disposed beneath the plate 54. When the pump 30 is operating, water in the aquarium 10 is drawn through the plate 54 and into the plenum 58 by the pump 30, helping to remove detritus and debris that can accumulate in the aquarium 10. The pump 30 pulls the detritus and debris into a water tube 62 that extends from the plenum 58 (e.g. extending alongside and underneath the plate 54 as illustrated in FIG. 1) to the pump 30. The water, detritus, and debris are directed through the water tubes 62 and 38 to the element 18 to be filtered by the filtration media 26. In other constructions the water tubes 62, 38 have other configurations, shapes, and sizes than those illustrated.

With continued reference to FIGS. 1-3, the gravel in the plate 54 is kept clean by the process of drawing water through the gravel. The combination of the plate 54, the plenum 58, the pump 30, and the element 18 makes maintenance easier for the user and improves success rates in keeping the aquarium 10 healthy. The use of the plate 54 and the plenum 58 also provides additional surface area for anaerobic bacteria to grow in the aquarium 10, which provides additional health benefits to the aquarium 10.

As described above, the pumping action of the pump 30 occurs prior to the water entering the filtration media 26. This arrangement advantageously enables direct intake from the substrate plenum 58, surface skimming, or mid water level draw depending on which is most desired. This is in contrast to other filtration systems where water overflows into a filtration media, and where the pumps are only used after the filtration has occurred.

Figure 5:
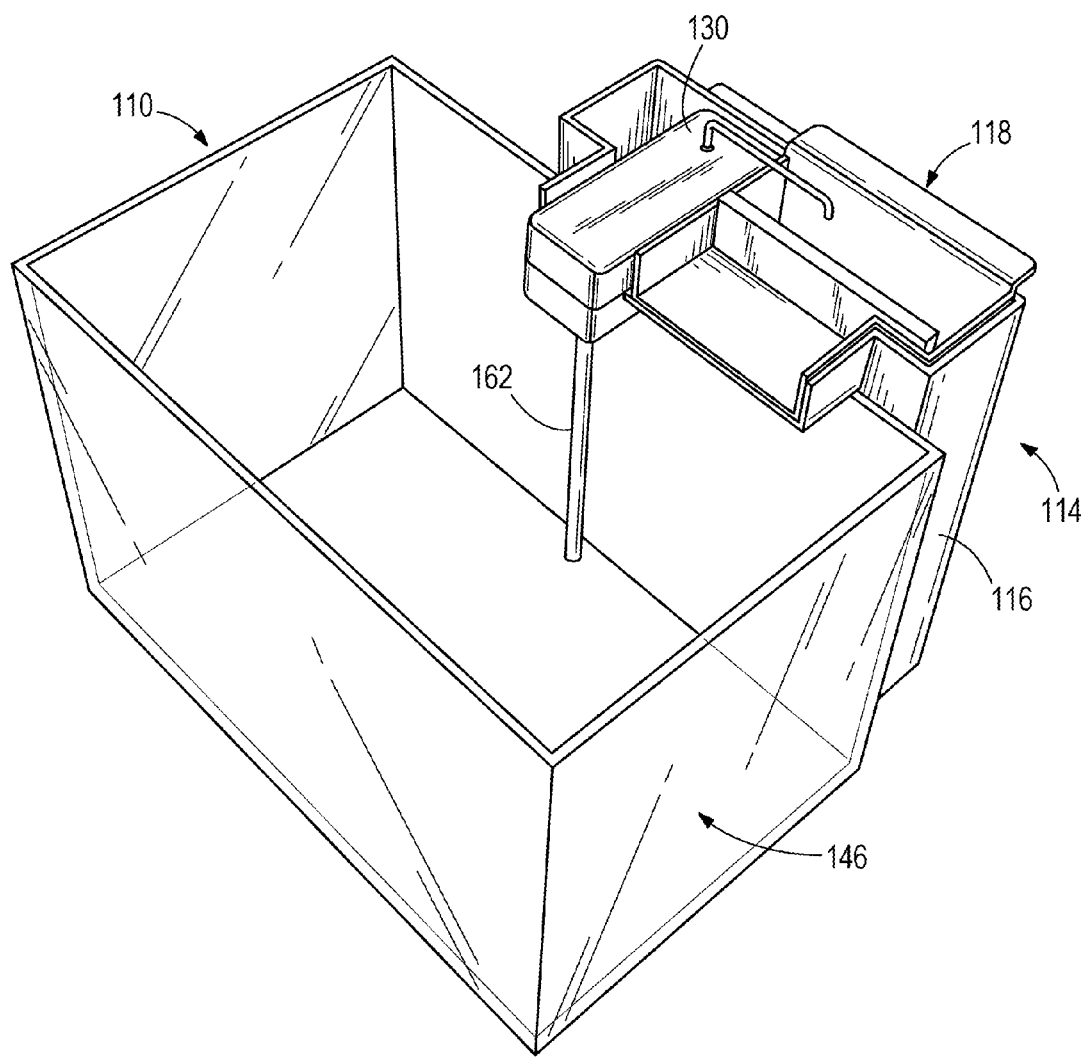
FIG. 5 is a perspective view of an aquarium with an external/hang-on filter filtration system according to another construction of the invention.
Figure 6:
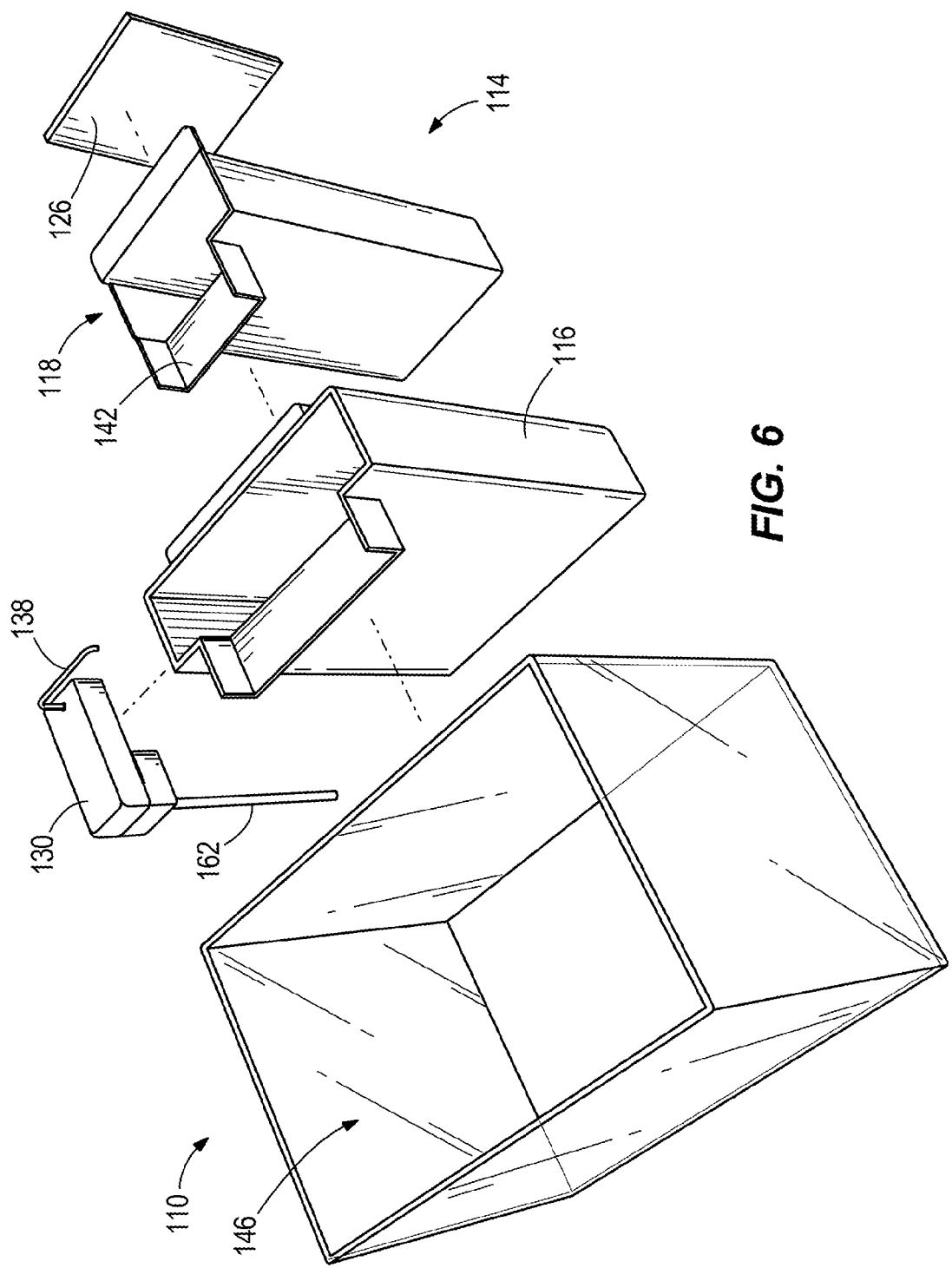
FIG. 6 is a perspective, exploded view of the components of the aquarium and external/hang-on filtration system of FIG. 5.
Figure 7:
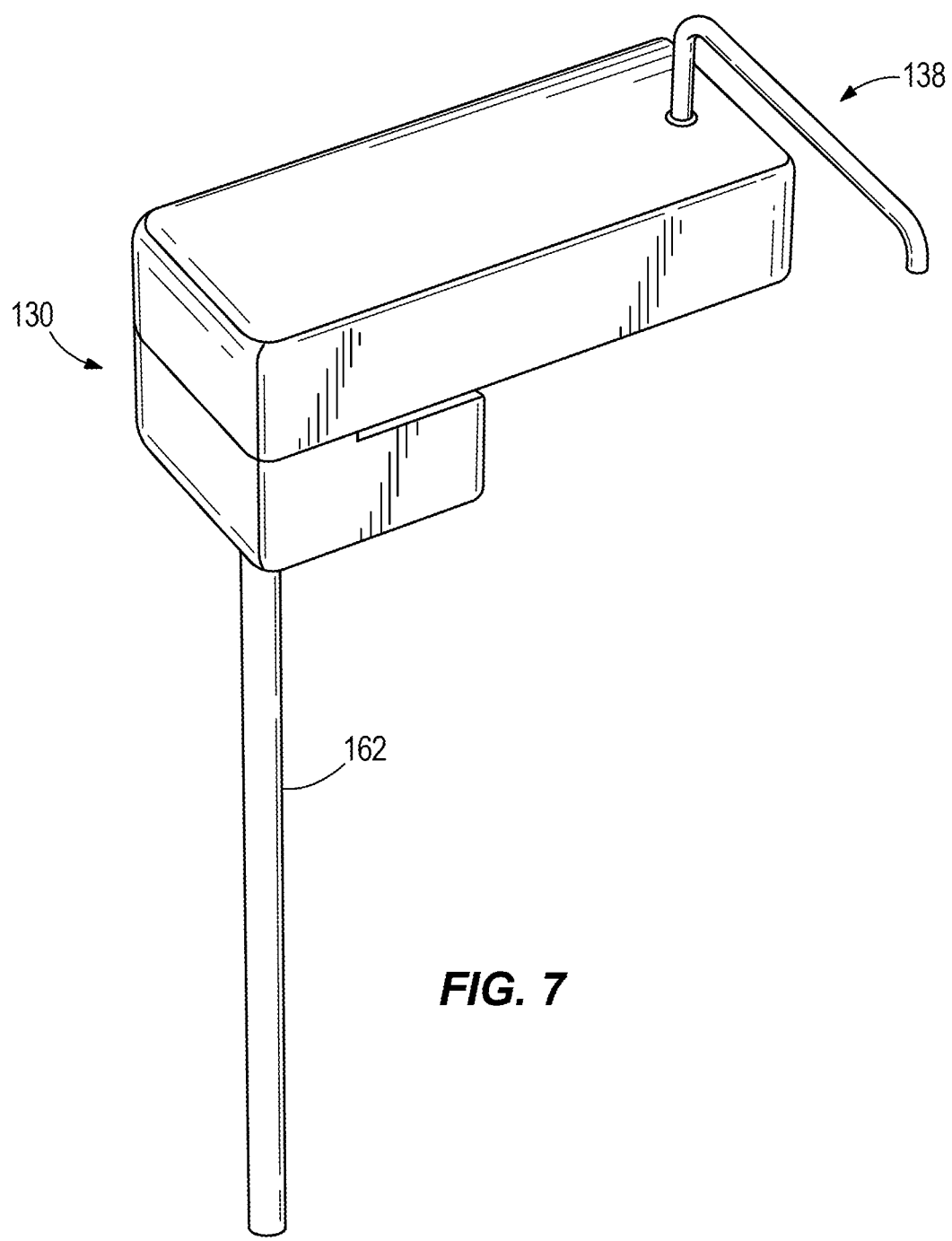
FIG. 7 is a perspective view of a pump assembly of the aquarium and external/hang-on filtration system of FIG. 5.

FIGS. 5-7 illustrate another aquarium 110 having a hang-on filtration system 114 that couples to a primary chamber 146 of the aquarium 110. The filtration system 114 includes a body 116 that remains coupled (e.g., permanently or removably) to the aquarium 110. The filtration system 114 also includes a removable filter element 118 and a pump 130, both contained at least partially within the body 116. The element 118 has a return spout or ramp 142. As illustrated in FIG. 5, the filtration system 114 also includes a filtration media 126 contained within the element 118, similar to the filtration media 26 described above.

With continued reference to FIGS. 5-7, the body 116 is a container that is configured to be a dry container but to be water tight as a back-up protection should water start to overflow from the filter element 118 but fail to enter the primary chamber 146. In some constructions the element 118 is of a minimal volume to contain only the filtration media 126. In some constructions the volume of the element 118 is up to 15-25% of a total water volume of the aquarium 110 (i.e., a water volume that resides in primary chamber 146 while the filtration system 114 is not in use) to be able to fully accommodate water changes in the aquarium 110. In some constructions the element 118 is sized to receive and hold between approximately 10%-25% of the total water volume. With the element 118 containing 15-25% of the total water volume of the aquarium 110, the filtration system 114 is designed for successful and easy water changes in addition to filter media 126 maintenance and changing.

With continued reference to FIG. 7, the pump 130 includes a water tube 162 that pulls water directly from the aquarium 110. In some constructions the water tube 162 is connected to an under-gravel plate, similar to the plate 54 described above, to provide the same benefits as the internal filtration system 14. The pump 130 is configured to be as small as possible and pumps water through a water tube 138 to the element 118. The water tube 138 is a tube that rotates from a normal, first operation position in which the pump 130 pumps water into the element 118 to a second position that is used to service the aquarium 110 in which the water circulates back into the aquarium 110 instead of into the element 118. In other constructions the water tubes 138, 162 have other configurations, shapes, and sizes than those illustrated.

Figure 8:
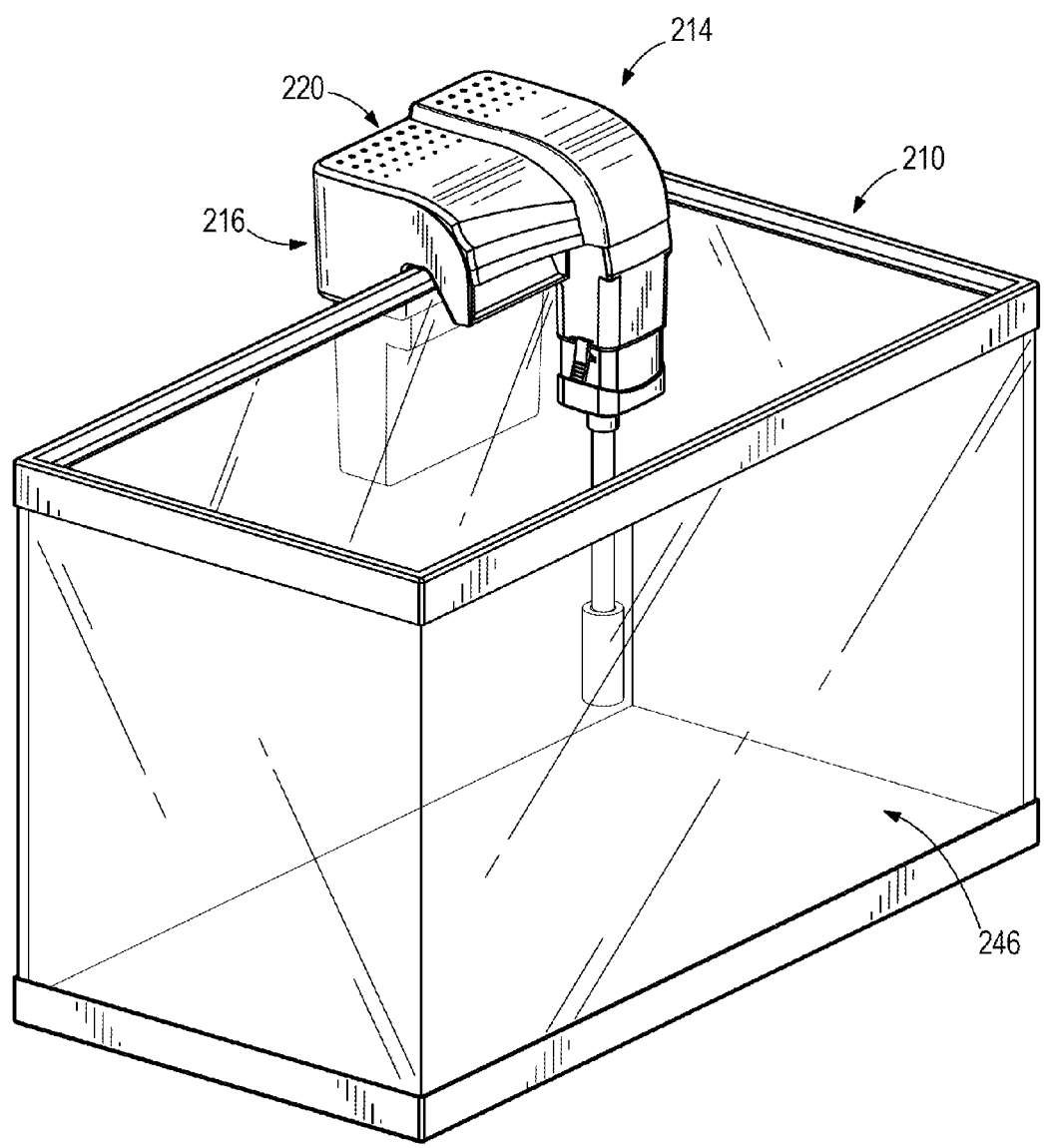
FIG. 8 is a perspective view of an aquarium with an external/hang-on filtration system according to another construction of the invention.
Figure 9:
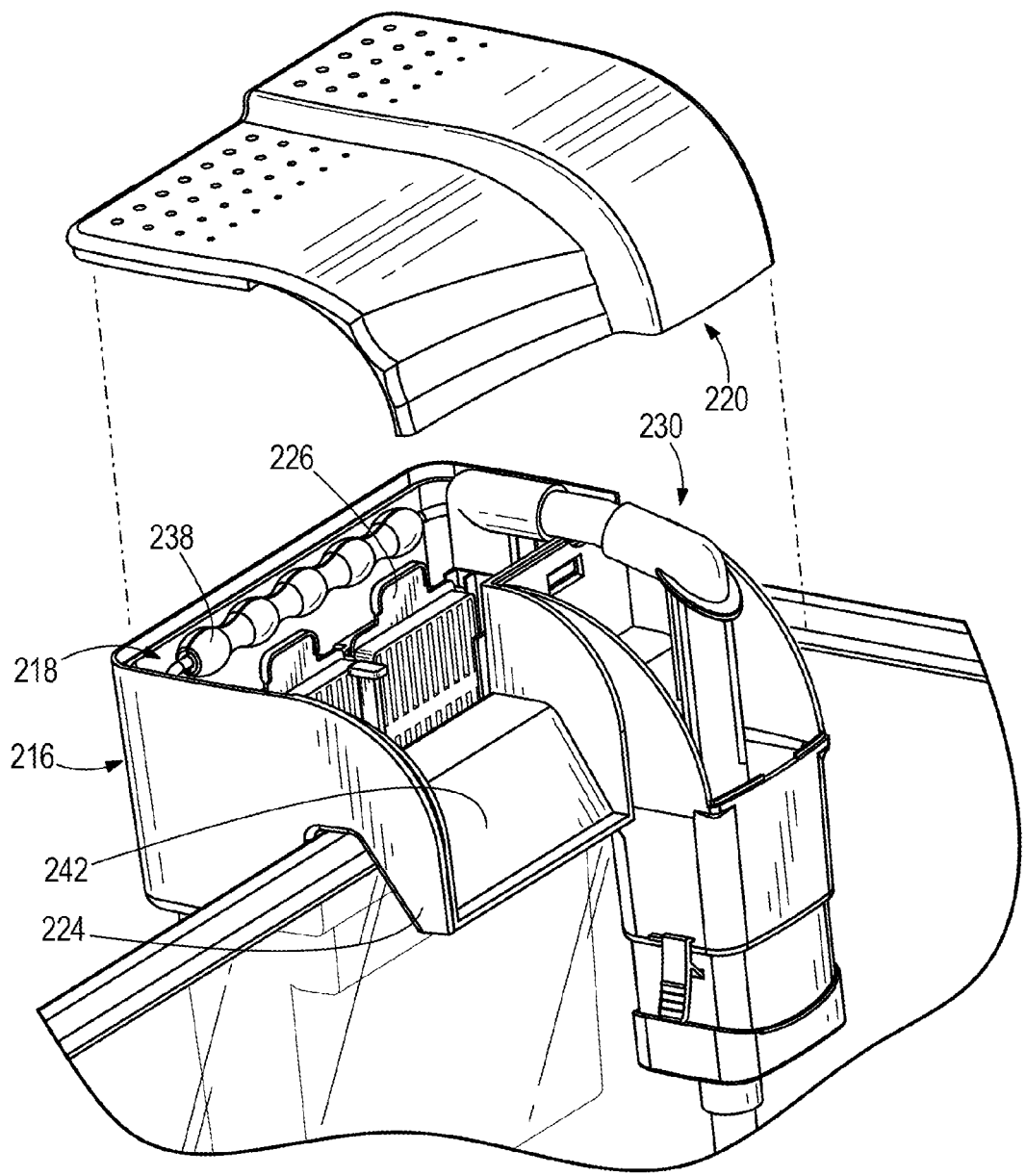
FIG. 9 is a partially exploded perspective view of the filtration system of FIG. 8.
Figure 10:
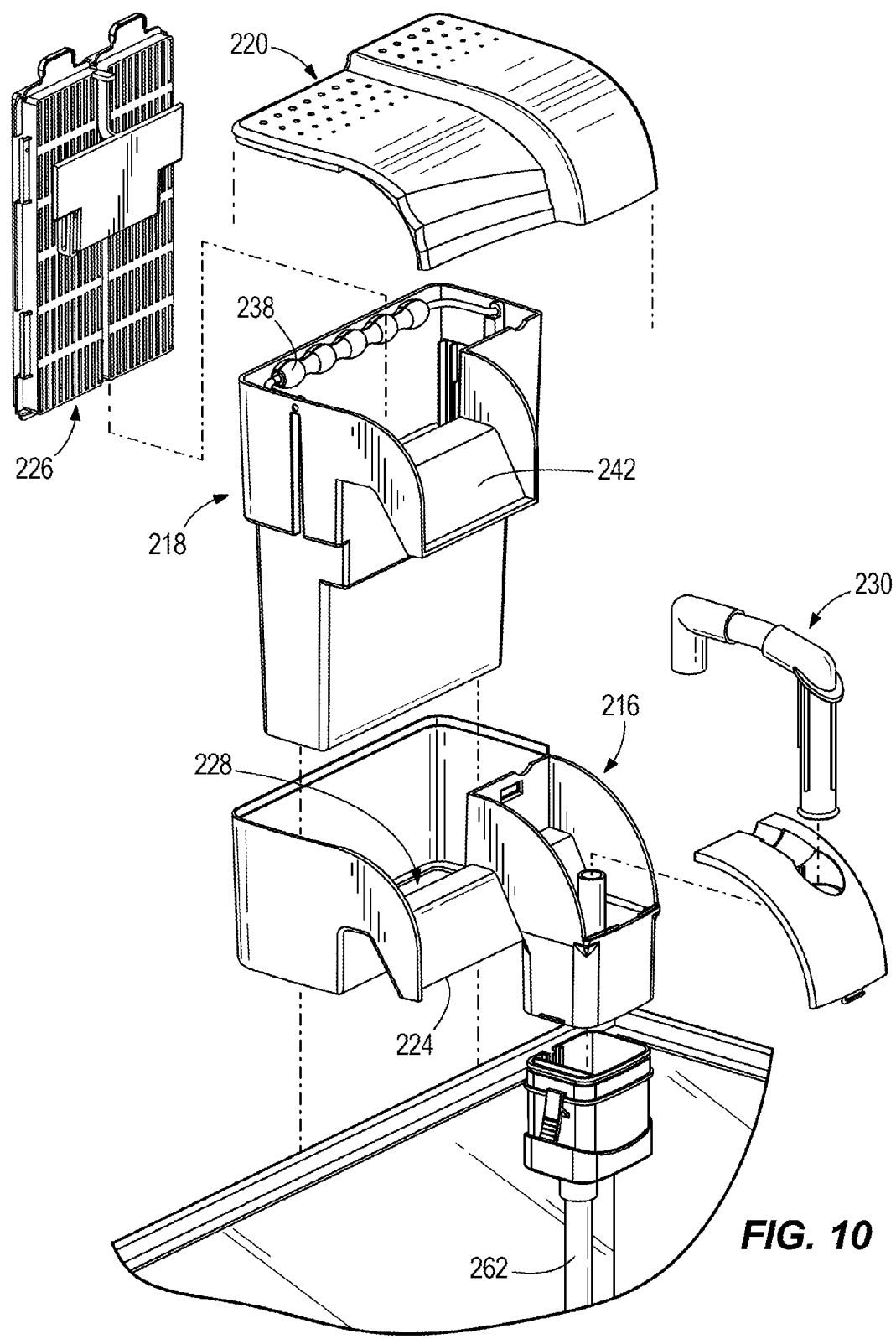
FIG. 10 is a fully exploded perspective view of the filtration system of FIG. 8.

FIGS. 8-10 illustrate another aquarium 210 having a hang-on filtration system 214 that couples to a primary chamber 246 of the aquarium 210. The filtration system 214 includes a body 216 that remains coupled to the aquarium 210. The filtration system 214 also includes a removable element 218 and a pump 230, both contained at least partially within the body 216. The element 218 has a return spout or ramp 242. The filtration system 214 also includes a filtration media 226 contained within the element 218, similar to the filtration elements 26 and 126 described above.

With continued reference to FIGS. 8-10, the body 216 includes a cover 220 that provides protection over the element 218, as well as a spout or ramp 224. As illustrated in FIG. 10, the body 216 has an opening 228 that receives the element 218, such that the element 218 is able to be inserted into and removed from the opening 228, and such that the spout or ramp 242 rests on the spout or ramp 224.

In some construction the element 218 is of minimal volume to contain the filtration media 226. In some constructions the volume of the element 218 is up to 15-25% of a total water volume of the aquarium 210 (i.e., a water volume that resides in primary chamber 246 while the filtration system 214 is not in use) to be able to fully accommodate water changes in the aquarium 210. In some constructions the element 218 is sized to receive and hold between approximately 10%-25% of the total water volume. With the removable element 218 containing 15-25% of the total water volume of the aquarium 210, the filtration system 214 is designed for successful and easy water changes in additional to filter media 226 maintenance and changing.

With continued reference to FIGS. 8-10, the pump 230 includes a water tube 262 that pulls water directly from the aquarium 210. In some constructions the water tube 262 is connected to an under-gravel plate, similar to the plate 54 described above, to provide the same benefits as the internal filtration system 14. The pump 230 is configured to be as small as possible and pumps water through a water tube 238 to the removable element 218. The water tube 238 is a simple tube that rotates from a normal, first position in which the pump 230 pumps water into the filter element 218 to a second position that is used to service the aquarium 210 in which the water circulates back into the aquarium 210 instead of into the element 218. In other constructions the water tubes 238, 262 have other configurations, shapes, and sizes than those illustrated.

The following is an example of a maintenance schedule to be performed on one or more of the aquariums 10, 110, 210:

Filter replacement: The filtration media 26, 126, 226 is replaced by performing the following steps:

a. Rotate the water tube 38, 138, 238 from the first position (i.e., a "run") position in which effluent water enters the removable filter element 18, 118, 238 to a second position in which the water re-circulates within the aquarium 10, 110, 210. Alternatively, the water from the pump 30, 130, 230 may be turned off and if necessary the water tube 38, 138, 238 moved so as to make it easy to remove the element 18, 118, 218.

b. Remove the element 18, 118, 218 from the aquarium 10, 110, 210. The element 18, 118, 218 is now a container to carry the soiled filtration media 26, 126, 226 to service location of choice (for example, a sink, garbage can or other maintenance location. This allows clean service of the filtration media 26, 126, 226 without re-soiling the aquarium 10, 110, 210 and also provides an alternative to dripping dirty water, algae and other detritus across the aquarium 10, 110, 210 floor, etc. when servicing the filtration media 26, 126, 226.

c. Once at the service location, remove and dispose of the filtration media 26, 126, 226. Alternatively the filtration media 26, 126, 226 may be removed and cleaned. Replace the filtration media 26, 126, 226 with a new (or cleaned) filtration media 26, 126, 226 positioned within the element 18, 118, 218.

d. Transport the element 18, 118, 218 with the serviced filtration media 26, 126, 226 in place back to the aquarium 10, 110, 210.

e. Return the element 18, 118, 218 into the chamber 22 or the body 116, 216.

f. Return water flow to its original path. In the case of continuous water circulation, return the water tube 38, 138, 238 from a recirculating mode back to a filtering mode. This returns water circulation to flow through the filtration media

26, 126, 226. In the example of turning the aquarium water pump 30, 130, 230 off as opposed to a water bypass, return the water tube 38, 138, 238 back to its filtering (i.e., first) position if necessary and restart the aquarium pump 30, 130, 230.

Water replacement: The water in the system is partially replaced by performing the following steps:

a. Turn water tube 38, 138, 238 from the first (i.e., "run") position in which effluent water enters the removable element 18, 118, 218 to a position in which the water re-circulates with the aquarium 10, 110, 210. Alternatively, the water from the pump 30, 130, 230 may be turned off and if necessary the water tube 38, 138, 238 moved so as to make it easy to remove the element 18, 118, 218.

b. Remove the element 18, 118, 218 from the aquarium 10, 110, 210. The element 18, 118, 218 is now a container to carry the soiled filtration media 26, 126, 226 to a service location of choice (for example, a sink, outside, etc.). This quick as well as dry service of the aquarium 10 for a water change occurs without the need for additional equipment or without the normal issues of dripping dirty water, algae and other detritus across the aquarium, floor, etc. when performing a water change. It further aids in small spaces where equipment storage for a water change can be problematic.

c. Dispose of the water retained in the element 18, 118, 218 down a drain. The filtration media 26, 126, 226 may stay in place if desired. If it is to be replaced during the water change, it should be removed at this step.

d. Clean the element 18, 118, 218 if desired.

e. Fill the element 18, 118, 218 with clean water and add dechlorinator if necessary. Make sure the filtration media 26, 126, 226 is removed during the dechlorination process.

f. Return the filtration media 26, 126, 126 to the element 18, 118, 218 if it was serviced or replaced during the water change.

g. Transport the element 18, 118, 218 with clean water back to the aquarium 10, 110, 210.

h. Return the element 18, 118, 218 into the chamber 22 or the body 116, 216.

i. Return water flow to its original path. For continuous water circulation, return the water tube 38, 138, 238 from a re-circulating mode back to a filtering mode. This returns water circulation to flow through the filtration media 26, 126, 226. In the example of turning the aquarium pump 30, 130, 230 off as opposed to a water bypass, return the water tube 38, 138, 238 back to its filtering (i.e., first) position if necessary and restart the aquarium filter pump 30, 130, 230.

The advantages of the filtration systems 14, 114, 214 described above include, without limitation, the ability to service an aquarium 10, 110, 210 while the aquarium continues to circulate water, as well as maintain a constant water level in the aquarium. This is advantageous for a variety of reasons. First, the health of the aquatic life is significantly enhanced by maintaining aeration and circulation. Second, elements such as aquarium heaters that may become exposed under traditional servicing practices remain submersed reducing a significant risk factor to the consumer. Further, the filtration systems 14, 114, 214 provide ways to access and change aquarium filtration media 26, 126, 226 in a clean and dry fashion. This prevents re-soiling of an aquarium as cartridges are removed. It also allows for "drip-free" maintenance when servicing the aquarium 10, 110, 210.

Another advantage is that these filtration systems 14, 114, 214 introduce a new way of conducting water changes, and that the filtration systems 14, 114, 214 are incorporated into the aquarium 10, 110, 210 itself. For small aquariums (e.g., less than 10 gallons) water changes are often performed by moving the entire aquarium to the sink for maintenance and water change. The filtration systems 14, 114, 214 described above reduce the risks of moving a full aquarium and make it easier for the consumer to service. The advantages are vast in that the filtration systems 14, 114, 214 address all three maintenance elements of an aquarium. They make water changes easier and cleaner as well as integrated into the aquarium, they make filtration maintenance easier and cleaner, and they make aesthetic maintenance of the aquarium easier (e.g., when coupled with an under-gravel plate 54 which helps to remove detritus and debris that adds to algae growth and other unsightly deposits). The filtration systems 14, 114, 214 additionally increase the success rates of consumers that are beginning in the aquarium-keeping hobby as they teach how to properly and safely maintain an aquarium for the greatest benefit of the aquarium's inhabitants.

Although the invention has been described in detail with reference to certain preferred embodiments, variations and modifications exist within the scope and spirit of one or more independent aspects of the invention as described.

What is claimed is:

1. An aquarium comprising:
a wall defining an aquarium space having a first volume;
a chamber coupled to the wall and disposed outside of the space, the chamber defining a second volume fluidly isolated from the first volume;
a removable element at least partially disposed within and coupled to the chamber, the removable element defining a third volume that is smaller than the first volume and the second volume, wherein an upper end of the removable element is open such that the third volume is exposed to an environment outside of the aquarium;
a filter at least partially disposed within the removable element, the removable element and the filter selectively de-couplable from the chamber to allow the selective removal of the filter from the aquarium;
a pump disposed outside of the removable element; and
a flexible, movable tube that directs a flow of liquid from the pump, wherein the flexible, movable tube includes a free distal end that is movable by hand between the first volume and the third volume to direct the flow of liquid directly to the first volume or directly to the third volume as desired;
wherein the filter and the pump are arranged such that the flow of liquid within the aquarium is configured to flow sequentially from the first volume directly to the pump, without passing through the filter;
wherein the removable element includes an interior surface and an exterior surface, and wherein the entire exterior surface remains dry during filtration operations.

2. The aquarium of claim 1, wherein the third volume is about 10 percent to about 25 percent of the first volume.

3. The aquarium of claim 1, wherein the chamber includes a hook that engages the wall to hang the chamber on the wall.

4. The aquarium of claim 1, wherein the chamber is at least partially defined by the wall and is not de-couplable from the wall.

5. The aquarium of claim 1, wherein the removable element includes a spout that redirects filtered liquid directly from the filter into the first volume via gravity.

6. The aquarium of claim 5, wherein the chamber includes a second spout that at least partially defines a hook that engages the wall, and wherein the spout is at least partially nested within the second spout.

7. The aquarium of claim 1, wherein the removable element includes a handle.

8. The aquarium of claim 1, wherein the movable tube includes a first, stationary end and a second, movable end disposed opposite the first end, wherein the second end is movable between a first position inside the first volume and a second position inside the third volume.

9. The aquarium of claim 8, wherein the removable element and the filter are selectively de-couplable from the chamber such that a complete removal of the removable element and the filter from the aquarium is configured to occur while the flow of liquid continues to pass out of the second end of the tube.

10. An aquarium comprising:
a first chamber defining a first volume;
a dry chamber disposed adjacent the first chamber and defining a second volume;
a removable element at least partially disposed within the dry chamber, the removable element being selectively removable from the dry chamber;
a filter at least partially disposed within the removable element;
a pump including an intake and an outlet, the intake arranged to draw a flow of liquid from the first volume during pump operation; and
a tube having a first end connected to the outlet and a second end movable between a first position in which the flow of liquid passes out of the second end, then through the filter and then into the first volume, and a second position in which the flow of liquid flows directly from the second end and into the first volume without passing through the filter,
wherein the filter is at least partially disposed within the removable element when the second end is in both the first position and the second position, and
wherein the removable element includes a spout that redirects filtered liquid from the filter directly into the first volume via gravity.

11. The aquarium of claim 10, wherein the filter includes a third volume that is about 10 percent to about 25 percent of the first volume.

12. The aquarium of claim 10, wherein the removable element includes an interior surface and an exterior surface, and wherein the exterior surface remains dry during filtration operations.

13. The aquarium of claim 10, wherein the chamber is at least partially defined by a wall of the aquarium and is not de-couplable from the wall.

14. The aquarium of claim 10, wherein the removable element defines a third volume, wherein the first end of the tube is stationary, and wherein the second end is movable between a first position inside the first volume and a second position inside the third volume.

15. The aquarium of claim 10, wherein the removable element and the filter are selectively removable from the dry chamber such that a complete removal of the removable element and the filter from the aquarium is configured to occur while the flow of liquid continues to pass out of the second end of the tube.

16. The aquarium of claim 10, wherein in the first position the flow of liquid passes out of the second end, then through the filter and then into the first volume prior to being returned to the pump and the tube.

* * * * *

UNITED STATES PATENT AND TRADEMARK OFFICE
CERTIFICATE OF CORRECTION

PATENT NO. : 9,788,533 B2  
APPLICATION NO. : 14/047558  
DATED : October 17, 2017  
INVENTOR(S) : Matthew Allen and Thomas Lutz Page 1 of 1

It is certified that error appears in the above-identified patent and that said Letters Patent is hereby corrected as shown below:

On the Title Page

Under the subheading "Related U.S. Application Data," replace the Provisional application No. "61/711,571" with the No. --61/711,572--

Signed and Sealed this
Twentieth Day of February, 2018

Andrei Iancu
*Director of the United States Patent and Trademark Office*